United States Patent Office 2,735,873
Patented Feb. 21, 1956

2,735,873

PROCESS FOR THE PREPARATION OF PHENOL

Johan R. H. Goris, Geleen, Netherlands, assignor to Stamicarbon N. V., Heerlen, Netherlands No Drawing. Application March 3, 1952, Serial No. 274,651

Claims priority, application Netherlands March 17, 1948

3 Claims. (Cl. 260—628)

This invention relates to the prepartion of phenol from alkali metal salts of the corresponding benzene sulfonic acid.

It has previously been proposed to prepare phenol by reacting salts of benzene sulfonic acids with alkaline earth hydroxides in the presence of steam. When operating in accordance with such procedures, however, swelling and frothing of the reaction mixture have been found to represent major difficulties with the result that successful operation of these prior techniques has been difficult to attain.

In U. S. Patent No. 2,407,044, it has been proposed to counteract the tendency of reaction mixtures of the type described above to froth or swell by utilizing steam at pressures above atmospheric. This expedient will eliminate, or at least decrease, frothing or swelling of the reaction mixture, but it makes control of the reaction troublesome and, in general, renders the procedures less commercially attractive.

In my copending U. S. application,, Serial No. 81,829, filed March 16, 1949, now abandoned, there has been described a process for preparing phenol from salts of benzene sulfonic acid by means of alkaline earth hydroxides and steam, in which undesired swelling or frothing of the reaction mixture is prevented by preliminarily heating the reaction mixture in the presence of an inert gas, such as nitrogen.

It has now been unexpectedly found that frothing and swelling of the reaction mixture may be prevented in another simpler way. Hence, an object of this invention is to provide an additional way of avoiding frothing and swelling of the reaction mixture used in the formation of phenol from alkali metal salts of benzene mono sulfonic acid in a convenient and simple fashion.

Another object of the invention is the provision of novel procedures for producing phenol in excellent yield by a reaction which proceeds smoothly, does not require the use of steam at pressures above atmospheric, as suggested in the above mentioned U. S. Patent No. 2,407,044, and eliminates the disadvantages occasioned by such use of superatmospheric pressures.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The above objects are realized by virtue of the unexpected discovery that swelling or frothing of reaction mixtures of the type herein described can be avoided and excellent yields of phenol obtained, if in place of calcium hydroxide or other alkaline earth hydroxides, quick lime is employed and this material is added as such to an aqueous solution comprising 65 to 75% by weight of an alkali metal salt of benzene mono sulfonic acid at or near the boiling point of the solution, specifically, between 85 and 100° C., the reaction mixture thereafter allowed to dry and the dried mixture heated in conventional manner in the presence of steam to give the desired phenol.

The success of the invention resides, at least to a substantial extent, in the use of three critical features, each of which is essential to give the desired results. These features are:

(a) The use of a specific form of calcium oxide, namely, quick lime, as contrasted to the use of other forms of calcium oxide, such as dead burnt lime;

(b) Addition of the quick lime to an aqueous solution of 65 to 75% by weight of the alkali metal sulfonate, and (c) Reaction of the quick lime and the sulfonate at a temperature between 85 and 100° C.

It is not fully understood just what occurs when using the present procedures including the critical features outlined above. Apparently, a portion, or perhaps all of the salt of the sulfonic acid is converted to the calcium hydroxy salt of the sulfonic acid which, upon being heated is converted into phenol and calcium sulfite. In any event, the important thing is that, when using the unique procedures described herein, frothing and swelling of the reaction mixture during the subsequent heating in the presence of steam are eliminated.

The aqueous solution of the alkali metal sulfonates required by the invention cannot be prepared at normal temperatures, i. e., temperatures in the neighborhood of 25° C., since the sulfonates do not possess the solubility necessary to give the required concentrations at such temperatures, the solubility of the alkali metal sulfonates at 25° C. being below 60% and when solutions of such a concentration are reacted with quick lime, frothing and swelling to an undesirable extent are still found to occur.

The sulfonate solutions are prepared by dissolving the requisite amount of sulfonate in water maintained at temperatures near the boiling point, i. e., 85 to 100° C. When a sulfonate solution of the necessary concentration has been obtained, the quick lime is then reacted with sulfonate by addition as such to the solution with stirring at a temperature within the range of 85 to 100° C. The proportion of quick lime to sulfonate may be rather widely varied. Generally, the quick lime should be present in at least the theoretical quantity, i. e., one equivalent of quick lime for each molecular proportion of sulfonate, but an excess of quick lime may also be used without disadvantage.

After the quick lime has been added to the heated aqueous solution of the sulfonate, in accordance with the invention, the reaction mixture is allowed to dry by evaporation. This drying of the reaction mixture may be carried out in any satisfactory way, for instance, by means of rotary driers or by stirring the reaction mixture while simultaneously heating the same at an elevated temperature which advantageously will be within the temperature range of 85 to 100° C. required for reaction between the quick lime and sulfonate.

The reaction mixture is preferably granulated since, in this way, the passing of steam therethrough during the subsequent heat treatment is facilitated. The granulated product may be directly obtained by evaporating water from the reaction mixture while stirring the same in, for example, a screw-type granulating device. On the other hand, the dried reaction mixture may also be pressed into briquettes, pellets, tablets or similar products for the subsequent heat treatment.

The conversion of the dried reaction mixture into phenol by heating the mixture in the presence of steam may be performed at the customary temperatures within the range of 350 to 450° C. It has been found that the reaction can be made to proceed rapidly with a favorable yield of phenol amounting to more than 90% of the theoretical quantity, if the conversion is effected at temperatures between 400 and 420° C. In this case, the reaction mixture may be preheated in the presence of air or by the passage of steam therethrough without the application of inert gases being required.

The potassium salt of benzene mono sulfonic acid as well as the sodium salt thereof, or mixtures of these, may serve as sulfonic salts suitable for use in the present procedures. If desired, other substances, having a favorable effect upon the reaction, may be added to these salts, such as potassium salts, for instance, potassium chloride, potassium sulfite, etc.

EXAMPLES

A more complete understanding of the unique procedures of this invention and the advantages which they offer may be had by reference to the following specific examples.

*Example I*

A solution of 100 grams of potassium benzene-sulfonate in 50 grams of water was prepared by adding the sulfonate to the water at a temperature between 85 and 100° C. Thereafter, 21.5 grams of quick lime were added to the sulfonated solution while the latter was stirred and the temperature thereof kept within the range of 85 to 100° C. The pulp obtained was dried by evaporation while being stirred and a granulated solid product obtained.

The granulated product was introduced into a reaction space and heated to 400 to 420° C., while steam at atmospheric pressure was simultaneously passed across it. The passage of steam was continued for some time after the desired temperature had been reached. The steam, which had been preheated to 420° C., was passed in hourly amounts of 100 grams of steam per 300 grams of potassium benzene sulfonate. The reaction proceeded smoothly without the occurrence of swelling or frothing of the reaction mixture.

The vapors leaving the reaction space were condensed after which the phenol was separated from the condensate. After steam had been passed for 1½ hours, it was found that 98% of the potassium benzene sulfonate had been converted with the formation of 44.6 grams of phenol, corresponding at this degree of conversion, with a yield of 95% of the theoretical amount of phenol.

*Example II*

A 100 grams of sodium benzene sulfonate and 30 grams of potassium chloride were dissolved in 60 grams of water at 85 to 100° C. To the resulting solution, there were added 20.5 grams of quick lime and the pulp obtained was dried by evaporation while being stirred. By this operation, the mixture was granulated and the grains were treated in the manner described in Example I. The reaction again was found to proceed without frothing or swelling.

After passing steam for 2½ hours at 400 to 420° C., it was found that 81% of the sodium benzene sulfonate had been converted. The yield amounted to 40 grams of phenol, corresponding at this degree of conversion with a yield of 94% of the theoretical amount.

*Example III*

100 grams of potassium benzene sulfonate was dissolved in 50 grams of water kept at 85 to 100° C. Then 21.5 grams of quick lime were stirred into the sulfonate solution at a temperature of 85 to 100° C. and the pulp obtained was dried by evaporation, while being stirred. After being ground, the mixture was pressed into briquettes at a pressure of 150 kg./cm.$^2$. The briquettes were then placed in a reaction space and further treated as described in Example I. It was found that the reaction proceeded without frothing or swelling of the reaction mixture. After steam had been passed through the reaction mixture for 1½ hours, it was found that 97½% of the potassium benzene sulfonate had been converted, corresponding at this degree of conversion with a yield of 94½% of the theoretical amount of phenol.

*Example IV*

This example illustrates the importance of using quick lime in the procedure of the invention.

A solution of 10 kg. of potassium benzene sulfonate in 5 kg. of water was first prepared by adding the sulfonate to water at a temperature of between 85 and 100° C. Thereafter, while maintaining the temperature of the solution substantially constant, 2.2 kg. of calcium oxide in the form of dead burnt lime were stirred into the solution. Thereafter, water was evaporated from the resulting pulp and a granulated, solid product obtained. The granulated product was then introduced into a reaction space and further treated as in Example I, i. e., it was heated to 400 to 420° C., while simultaneously passing steam at atmospheric pressure therethrough. It was found that considerable swelling and frothing of the reaction mixture occurred and after passage of the steam for a short time, swelling and frothing were such that the steam treatment had to be interrupted and the reaction could no longer be continued. It was also found that, in contrast to the procedure of Example I, a considerable amount of the reaction mixture adhered to the walls of the reaction vessel, so that a substantial amount of work was necessary to clean the walls of the vessel.

*Example V*

This particular example illustrates the difficulty which results when operating with calcium hydroxide, in lieu of quick lime.

A granulated reaction mixture was obtained in the manner set out in Example IV, except that, instead of the lime, 3 kg. calcium hydroxide were employed. Frothing and swelling of the reaction mixture occurred on the passage of steam at atmospheric pressure therethrough with the result that the reaction had to be discontinued. Again, it was found that a considerable amount of the reaction mixture adhered to the walls of the reaction vessel.

When utilizing calcium hydroxide as an aqueous slurry, prepared from quick lime, for admixture with the benzene sulfonate, substantially the same undesirable results, i. e., frothing and adherence of the reaction mixture to the reaction vessel, with little or no yield of phenol were obtained.

*Example VI*

This example illustrates the criticality of the concentration of the sulfonate solution and the reaction temperature in obtaining the desirable results of the invention.

To 5 kg. of water at room temperature (about 25° C.) sufficient potassium benzene sulfonate was added to form a saturated solution. The concentration of the solution did not exceed 60% by weight of sulfonate. Thereafter, 2.2 kg. of quick lime were added to the sulfonate solution at room temperature. The pulp obtained was dried and a granulated solid product obtained.

When the granulated product was introduced into a reaction space and heated, in the manner described in Example I, frothing and swelling occurred with the result that the reaction had to be discontinued with the formation of little or no phenol.

As will be appreciated from the foregoing description, the procedures of the present invention offer the advantage of eliminating, in an extremely simple, yet highly unexpected fashion, the frothing or swelling customarily encountered in the preparation of phenol from the salts of sulfonic acids, and make it possible to obtain nearly quantitative yields of phenol in an easily controlled, smooth reaction.

This application is a continuation-in-part of my copending U. S. application, Serial No. 81,830, filed March 16, 1949, and now abandoned.

I claim:

1. A process for the preparation of phenol which comprises first forming an aqueous solution of 65 to 75% by weight of an alkali metal salt of benzene monosulfonic acid at a temperature between 85° and 100° C., thereafter adding quick lime to said solution while maintaining said solution within said temperature range and stirrng the resulting mixture, drying said mixture and thereafter heating the dried mixture in the presence of steam at a temperature between 350 and 450° C., whereby the salt of the sulfonic acid is transferred into phenol without any substantial frothing of the reaction mass.

2. A process according to claim 1, wherein the alkali metal salt of benzene monosulfonic acid is selected from the group consisting of sodium benzene monosulfonate and potassium benzene monosulfonate.

3. The process of claim 1, wherein the dried mixture is pressed into tablet-like masses prior to said steam treatment.

References Cited in the file of this patent

UNITED STATES PATENTS

| | | |
|---|---|---|
| 1,564,239 | Hillyer | Dec. 8, 1925 |
| 2,176,239 | Baird | Oct. 17, 1939 |
| 2,407,044 | Tyrer | Sept. 3, 1946 |
| 2,474,207 | Lovell et al. | June 28, 1949 |